United States Patent [19]

Hara et al.

[11] 4,218,247
[45] Aug. 19, 1980

[54] PHOTOCONDUCTIVE RESIN CONTAINING TERTIARY AMINO GROUPS FOR ELECTROPHOTOGRAPHY

[75] Inventors: Shigeyoshi Hara; Iwao Omae, both of Hino, Japan

[73] Assignee: Teijin Limited, Osaca, Japan

[21] Appl. No.: 933,577

[22] Filed: Aug. 14, 1978

Related U.S. Application Data

[63] Continuation of Ser. No. 660,980, Feb. 24, 1976, abandoned.

[30] Foreign Application Priority Data

Feb. 28, 1975 [JP] Japan .................................. 50-24063
May 20, 1975 [JP] Japan .................................. 50-59199

[51] Int. Cl.$^2$ ............................................. G03G 5/04
[52] U.S. Cl. .................................. 430/78; 252/501.1; 430/83
[58] Field of Search ................. 96/1.5, 1 PC; 252/501

[56] References Cited

U.S. PATENT DOCUMENTS

| | | | |
|---|---|---|---|
| 3,303,167 | 2/1967 | Kakiuchi et al. | 260/67 A |
| 3,513,221 | 5/1970 | Huang et al. | 260/72.5 X |
| 3,658,520 | 4/1972 | Brantly et al. | 96/1.5 |
| 3,704,269 | 11/1972 | Freeman et al. | 260/51.5 X |
| 3,714,121 | 1/1973 | Kobel et al. | 260/51.5 |
| 3,784,514 | 1/1974 | Tiedman | 260/51.5 X |
| 3,784,515 | 1/1974 | Freeman et al. | 260/51.5 X |
| 3,786,025 | 1/1974 | Freeman et al. | 260/51.5 X |
| 3,947,425 | 3/1976 | Freeman et al. | 260/51.5 X |
| 3,986,873 | 10/1976 | Sirotrina et al. | 96/1.5 |
| 4,003,873 | 1/1977 | Smith | 260/51.5 X |

*Primary Examiner*—John D. Welsh
*Attorney, Agent, or Firm*—Sherman & Shalloway

[57] ABSTRACT

An electrophotographic sensitive layer comprising a new soluble photoconductive resin containing an aromatic tertiary amino group of the following formula as a photoconductive functional group

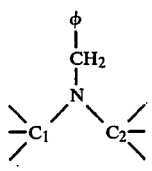

wherein $\phi$ represents a benzene nucleus containing at least one nitrogen-free electron donating substituent, $C_1$ represents a carbon atom on the aromatic ring, and $C_2$ represents a carbon atom which forms a hydrocarbon residue and takes a bond orbit of the $SP^2$ or $SP^3$ type; and the benzene nuclei represented by $\phi$ are bonded to each other through a methylene group to such an extent as to maintain the solubility of the resin.

11 Claims, No Drawings

PHOTOCONDUCTIVE RESIN CONTAINING TERTIARY AMINO GROUPS FOR ELECTROPHOTOGRAPHY

This is a continuation of application Ser. No. 660,980 filed Feb. 24, 1976, abandoned.

This invention relates to a very useful electrophotographic sensitive layer containing a soluble photoconductive resin as a photoconductive material.

The soluble photoconductive resin is characterized by containing an aromatic tertiary amino group of the following formula as a photoconductive functional group

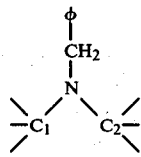
(1)

wherein $\phi$ represents a benzene nucleus containing at least one nitrogen-free electron donating nuclear substituent, $C_1$ represents a carbon atom on the aromatic ring, and $C_2$ represents a carbon atom which forms a hydrocarbon residue and takes a bond orbit of the $SP^2$ or $SP^3$ type; and the bezene nuclei represented by $\phi$ are bonded to each other through a methylene group to such an extent as to maintain the solubility of the resin.

Office copying by electrophotographic methods has become very widespread in recent years, and on the other hand, various attempts have been made to develop other uses that depend on the various characteristics of the electrophotographic methods. Some of these attempts have already resulted in commercially acceptable applications such as microfilms, microfiches, second masters for engineering drawings transparent sheets for overhead projectors, slides for slide projectors, and radiography.

The conventional electrophotographic methods used for office copying are roughly divided into a coated paper copying process (CPC for short) and a plain paper copying process (PPC for short). The former comprises forming a toner image directly on paper coated with a photoconductor and fixing it as such, and the latter comprises first forming a toner image on the surface of a photoconductor, then transferring it to plain paper, and fixing the image transferred. Generally, the CPC process has the advantage that a copying machine of simple structure can be used and the resulting image has good quality. But since the copying paper is coated with zinc oxide as a photoconductor, it is inconvenient to handle, and the resulting copy is heavy. On the other hand, the PPC process requires an apparatus of a complicated structure which is expensive. But since copying can be made on plain paper, the resulting copy has an appearance close to printed matter and thus gains a popular acceptance of the user. For this reason, the PPC process has become prevalent.

In the other applications mentioned above, however, the CPC process is frequently desirable or even essential from the standpoint of the quality of the images obtained, the desired size of the images, and the cost of image-forming machines. In addition, in many cases, it is necessary to use plastic film bases instead of paper, and plastic film and paper bases for such uses are frequently required to be transparent or translucent. Zinc oxide previously used mainly in the CPC process is non-transparent, and cannot be applied to such uses. It can be appreciated therefore that in order to apply electrophotography to such uses other than office copying, a photoconductive composition having transparency and flexibility and usable as a thin photosensitive layer on paper or a film is a very important key material.

Inorganic photoconductors are unsuitable for this purpose, and organic photoconductors become absolutely necessary. Investigations have been actively conducted in this field both on low-molecular-weight compounds and on high-molecular-weight compounds, but have been unable to provide photocondutors having entirely satisfactory utility such as the ease of use and cost in addition to good sensitivity.

It is an object of this invention therefore to provide an electrophotographic sensitive layer containing an organic photoconductor which is suitable for use as a photosensitive layer on a base such as film or paper, very easy to prepare, cheap, and easily shapable into a thin film by coating on the base and has sufficiently feasible sensitivity.

It is known that aromatic tertiary amines containing a unit of the formula

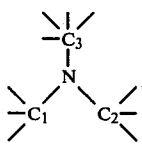
(Ia)

wherein $C_1$ is a carbon atom on an aromatic ring, and $C_2$ and $C_3$ represent carbon atoms forming a hydrocarbon residue and taking a bond orbit of the $SP^2$ type or $SP^3$ type, exhibit good photoconductivity preferably when combined with a suitable sensitizer. Typical examples of such amines are N-substituted carbazoles and substituted aniline derivatives.

Previously, the following three typical methods have been used to form electrophotographic photoconductive layers using compounds containing an aromatic tertiary amine unit.

(I) A lower-molecular-weight compound of a definite structure such as N-butyl carbazole is uniformly dissolved in a suitable high-molecular-weight compound to form a photosensitive layer, as disclosed in U.S. Pat. No. 3,206,306.

(II) As seen in the case of notable poly-N-vinylcarbazole, a polymer having a recurring unit of formula (Ia) above is prepared from a monomer containing a unit of formula (Ia) or its precursor unit, and the polymer is fabricated into a thin film form to make a photosensitive layer.

(III) As in the case of the reaction between polyepichlorohydrin and a carbazole alkali salt disclosed in Japanese Laid-Open Patent Publication No. 97,540/73, a polymer is reacted with a low-molecular-weight compound to introduce a unit of formula (1a) as a pendant group of the polymer.

According to method (I), a large amount of the low-molecular-weight photoconductive material is required in order to obtain sufficiently feasible sensitivity. It is very seldom however that the low-molecular-weight photoconductive material can form a stable mutually dissolved system with a binder polymer added to impart film-forming ability. Even when a stable system can be formed, it frequently undergoes phase separation or blooming and its quality changes, unless it is stored carefully as a photosensitive material.

In the case of method (II), the above-mentioned poly-N-vinylcarbazole and its substituted derivatives are considered to have best properties, and some of them are accepted commercially. However, since polymers of this kind are prepared through two steps of monomer synthesis and polymerization and the purification of the product in each step is strictly required in order to obtain feasible properties, the resulting polymers are generally very expensive, and can be used only in very limited applications.

According to method (III), however, the polymer and the low-molecular-weight compound used in a polymer reaction are both commercially available at lost cost. If they can be converted to a photoconductive polymer having good properties by a simple reaction, it will be obvious that there is a possibility of providing an electrophotographic sensitive layer having excellent utility and being free from the defects inherent to the methods (I) and (II) described above.

In order that the electrophotographic sensitive layer may have sufficient sensitivity, it is necessary to introduce a photoconductive group in an amount above a certain limit. In order to achieve this introduction without causing undesirable side-reactions such as gellation, the polymer and the low-molecular-weight compound must react selectively with each other with good reactivity. Actually, it is very difficult to find out combinations meeting these requirements from commercially utilizable polymers and low-molecular-weight compounds. In spite of many attempts, none have yet been accepted commercially.

We therefore made investigations in order to find photoconductive resins containing units of the type (1a) which can be obtained by a method following the method (III) described above and which has excellent utility. These investigations led to the discovery that the aforesaid resins containing the unit of formula (1) meet these requirements.

We first noted that soluble aromatic formaldehyde resins containing an electrophilic reactive group such as a methylol or dimethylol ether group, as typified by a xylene/formaldehyde resin or a resol resin are readily available as the trunk polymer. These resins are not the high-molecular-weight chain polymers used in the conventional method (III), but rather oligomers. We also noted that as the low-molecular-weight compounds, aromatic amine compounds of the following formula

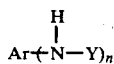
(2)

wherein Ar is an aromatic group, the group

is bonded to the carbon atoms, of the aromatic ring, n is 1 or 2, and Y is a hydrocarbon residue which optionally forms a ring with Ar either directly or through a nitrogen, oxygen or sulfur atom with the proviso that when n is 1, Y may be a hydrogen atom, such as carbazole, diphenylamine, aniline or methylaniline, are commercially available at low cost, and that the hydrogen atom bonded to the nitrogen atom in the above compound undergoes a substitution reaction with the electrophilic reactive group and is substituted by a group of the benzyl type thereby to form a unit of formula (Ia) which is introduced into the polymer.

The present invention provides an electrophotographic sensitive layer at least comprising a soluble aromatic tertiary amino-containing resin as a photoconductive material, said soluble aromatic tertiary amino-containing resin being prepared by reacting (1) a soluble low-molecular-weight polycondensate containing residues of a benzene compound having the following formula

(1-A)

wherein $\phi$ represents a benzene compound residue having a valence of at least 1 and at least one nitrogen-free electron donating nuclear substituent,
the carbon atoms of said benzene residues being linked by a linking group of the following formula

(1-B)

wherein m is 0 or a positive integer of 1 to 4,
and at least one of said benzene compound residues containing at least one pendant group of the following formula

(1-C)

wherein X represents a hydroxyl group, an alkoxy group, an O-acyl group, or a halogen atom,
as a substituent on the carbon atoms of the aromatic ring in principle, with (2) an aromatic amine compound of the following formula

(2)

wherein Ar is an aromatic group, the group

is bonded to the carbon atoms of the aromatic ring, n is 1 or 2, and Y is a hydrocarbon residue which optionally forms a ring with Ar either directly or through a nitrogen, oxygen or sulfur atom with the proviso that when n is 1, Y may be a hydrogen atom, thereby to substitute the methylene group bonded to the carbon atom of the benzene compound residue for the hydrogen atom bonded to the nitrogen atom forming the amino group of the aromatic amine compound (2).

The soluble aromatic tertiary amino-containing photoconductive resin used as a photoconductive material of the photosensitive layer in accordance with this invention can be prepared from the polycondensate (1) and the aromatic amine compound (2), both easily available commercially, by a simple procedure, for example, in the simplest case by merely mixing them and heating the mixture. Since this photoconductive resin has superior characteristics to be described below, it can provide a photosensitive layer having excellent utility.

Unlike the low-molecular-weight compound used in the method (I) above, the photoconductive resin is a glass-like transparent resin having film-forming ability, and can form a photosensitive layer without using a binder polymer. When a photosensitive layer having better flexibility is desired, a binder polymer can be added. The amount of the binder polymer can, however, be very small as compared with the case of the method (I). Furthermore, unlike the case of the method (II) which involves mutually dissolving a high-molecular-weight aliphatic polymer and another polymer, a very wide range of binder polymers are available for complete mutual dissolution with the photoconductive resin since its molecular weight is about that of oligomers although it is a polycondensate. Hence, according to the desired end use, a stable, transparent thin film-like photosensitive layer can be formed.

Furthermore, the photoconductive resin used in this invention surprisingly has better sensitivity than a model compound having definite structure in spite of the fact that because of the method of its preparation, its structure cannot be represented by definite repeating units. It has already been confirmed experimentally, as will be shown later in a comparative example, that for example, a composition of a polycondensate of a xylene resin and carbazole, a typical example of the photoconductive resin used in this invention, has far higher sensitivity than a composition of N-benzylcarbazole, a model compound having the same photoconductive functional group, when the same sensitizer and the same binder are incorporated in the same amounts. The same result is obtained when the sensitivity of a composition of a poly-condensate of xylene resin and aniline is compared with that of a composition of dibenzylaniline, a model compound of the former.

In view of the ease of preparing the photoconductive resin used in this invention, the latitude of compounding recipes for preparation of a photosensitive layer and its better sensitivity than model compounds owing to its particular structure, it will be readily appreciated that the present invention can afford an electrophotographic sensitive layer having excellent utility.

The electrophotographic sensitive layer of this invention can be formed even from the photoconductive resin alone. But in certain uses, the sensitivity of such a sensitive layer is low and its flexibility is insufficient. In many cases, therefore, it is preferred to incorporate suitable amounts of sensitizers and binding polymers.

The sensitizers, from the standpoint of their function, can be classified into optical sensitizers (or dye sensitizers) and chemical sensitizers. Where a high sensitivity is required, both types of sensitizers are frequently used together. In special cases, a substance which concurrently acts both as a binder polymer and as a chemical sensitizer can be used.

The photoconductive resin, the sensitizers, the binder polymers and the photosensitive layer will be described in detail below citing preferred examples.

1. PHOTOCONDUCTIVE RESIN (1-1) Soluble low-molecular-weight polycondensate

The soluble low-molecular-weight polycondensate used to prepare the photoconductive resin can be obtained by reacting a benzene-type compound containing at least one nitrogen-free electron donating nuclear substituent and at least two nuclearly substituted hydrogen atoms capable of methylol substitution by formaldehyde, with formaldehyde and/or its functional derivative in a manner known per se to cause addition-condensation. The addition-condensation should be carried out to an extent such that the resulting low-molecular-weight polycondensate is solvent soluble and preferably also fusible.

Suitable benzene-type compounds for preparing the soluble low-molecular-weight polycondensate are expressed by the following formula

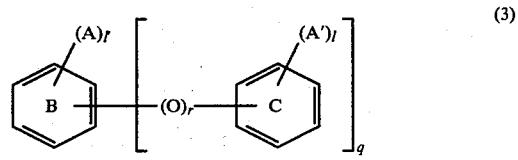

wherein l, l' and r are positive integers; [l+q×r] is 1, 2, 3 or 4; l' is 0 or 1, and when q is 0,

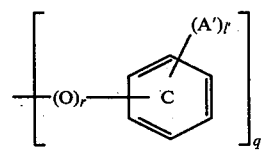

represents a hydrogen atom; r is 0 or 1, and when r is 0, the benzene ring C is directly bonded to the nuclear carbon atom of the benzene ring B; and A and A' are identical or different and represent at least one group selected from the class consisting of alkyl groups containing 1 to 4 carbon atoms, alkoxy groups containing 1 to 4 carbon atoms, a hydroxyl group and halogen atoms, with the proviso that when l or l' is 2 or more, A and A' may be different groups selected from the above class, and at least one of A and A' should be an electron donating group selected from the above class.

Examples of such benzene-type compounds include toluene, xylene, diphenylether, butylphenylether, phenol, cresol, xylenol, t-butylphenol, anisole, isopropylbenzene, trimethylbenzene, ethylbenzene, 1-butylbenzene, p-phenylphenol, trimethylsilylbenzene, pseudocumene, and durene. Of these, xylene, diphenylether, phenol or substituted (e.g., halogen- or alkyl-substituted) phenol are preferred. m-Xylene is especially preferred because it is substantially colorless. The formaldehyde and/or its functional derivatives are used mainly in the form of formaline, but also in the form of paraformaldehyde, trioxane or chloromethylmethyl ether.

The reaction between the benzene-type compound and formaldehyde and/or its functional derivatives is carried out by a suitable known method according to a given combination of the reactants. Naturally, it is not sufficient to merely obtain a polycondensation product, but care should be taken so that a reactive group capable of participating in a reaction with the aromatic amine compound of formula (2), that is, a methylol group or its functional derivative expressed by formula (1-C) or formula (1-B) wherein m is not less than 1, should remain in a sufficient amount.

In the case of a benzene-type compound which reacts mainly as a difunctional compound in a methylolation reaction, such as m-xylene, pseudocumene or durene, a soluble resin containing a methylol group, a dimethylol ether linkage, etc. in addition to a methylene linkage can be obtained by subjecting the benzene compound and an excess amount of formaldehyde in the form of formalin or trioxane to addition-condensation in the presence of an acid catalyst.

On the other hand, in the case of a benzene-type compound which reacts mainly as a trifunctional compound in a methylolation reaction, such as phenol or cresol, a soluble resin containing a reactive methylol group of the so-called resol type can be obtained by reacting it with formaldehyde in the presence of an alkali catalyst.

A benzene-type compound which is relatively difficult to methylolate, such as diphenylether, is chloromethylated with a mixture of hydrochloric acid and trioxane, a mixture of formalin, hydrochloric acid and sulfuric acid, or chloromethyl ether to form a resinous product.

The chloromethyl group could be used as a kind of a functional derivative of methylol group. Generally, however, it is preferably converted to a methylol group or dimethylol ether linkage by hydrolysis, or to an alkoxymethyl group by alcoholysis, or to an acryloxymethyl group by esterification prior to reaction with the aromatic amine compound of formula (2). This is preferred because corrosive hydrogen chloride does not form during the reaction.

Especially preferred polycondensates are a xylene resin using m-xylene, modified xylene resins, a diphenyl ether resin, and resol-type phenolic resin. "Nikanol" (trademark for a product of Mitsubishi Gas Chemicals, Co., Ltd.) having an oxygen content of 3 to 18% and a softening point (in the liquid state at room temperature) of up to 150° C. is suitable as the xylene resin or modified xylene resin. On the other hand, paint resins that cure on baking are suitable as the resol-type phenolic resin.

Generally, these resins preferably have a high content of a methylol group, a dimethylol ether group, and/or their functional derivatives because they react with the aromatic amine compound in a great ratio. However, if the content of these reactive groups is too large, a cross-linking reaction occurs competitively at the time of the reaction between the soluble low-molecular-weight polycondensate and the aromatic amine compound, and the product would become insolubilized. In order, therefore, to maintain the solubility of the photo-conductive resin of this invention, the content of these reactive groups should be adjusted to a suitable range according to the benzene nuclei constituting the aromatic amine compound of formula (2) or the soluble resin. The xylene resins are especially preferred in this regard since they do not substantially undergo a cross-linking reaction even when containing a large amount of reactive groups, and are less colored than phenolic resins.

Generally, the soluble low-molecular-weight polycondensates have a molecular weight of 200 to 3,000, and their content of a dimethylol ether group, a methylol group and/or its functional derivatives is one per 0.1 to 3 benzene nuclei.

Since one dimethylol ether group can react with two HN< groups as schematically shown below, its content, calculated as methylol group, is regarded as 2,

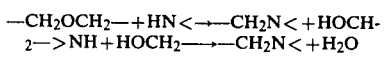

(1-2) Aromatic amine compound

The aromatic amine compound used to prepare the photoconductive resin is expressed by formula (2). Preferably, the aromatic group Ar in the formula contains 1 to 2 benzene or naphthalene nuclei containing 6 to 15 carbon atoms as an aromatic ring, and especially consists mainly of 1 to 2 such benzene groups. The carbon atoms on the aromatic ring may, for example, contain 1 to 3 substituents. Preferred substituents are alkyl groups containing 1 to 3 carbon atoms, alkoxy groups containing 1 to 3 carbon atoms, aryloxy groups containing 6 to 10 carbon atoms, N,N'-disubstituted amino groups, and halogen groups. A part (preferably not more than 30 mole%) of Ar can contain a strongly electron attracting substituent such as a nitro, cyano or alkoxycarbonyl group. But when a greater part of Ar contains such a group, it adversely affects the photoconductivity of the resulting resin, and therefore, such a large content of substituent is not preferred. When Y is an aromatic group, the same requirements for Ar and the same preferred examples as described above are applicable.

Ar and Y may be bonded to each other and form 1 to 2 aromatic fused multi-nuclei together with

Preferred examples are carbazole, phenoxazine, and indole. When Y is other than an aromatic group, it is preferably a hydrocarbon group containing 1 to 10 carbon atoms which may contain the same substituents as described above with regard to Ar. As in the case of indoline, for example. Ar and Y may be bonded to each other to form a fused multi-nucleus, as described above. Especially preferred examples of the hydrocarbon group are lower alkyl groups containing 1 to 3 carbon atoms and a benzyl group.

Specific examples of preferred aromatic amine compounds are given below.

(a) When n=1, and Y=H:

Aniline, toluidine, xylydine, p-ethylaniline, p-chloroaniline, p-bromoaniline, 2,4-dichloroaniline, p-anisidine, o-anisidine, N,N-dimethyl-p-phenylenediamine, and α- or β-naphthylamine.

(b) When n=1, and Y is not an aromatic group and is not bonded to Ar:

N-methylaniline, N-ethylaniline, N-propylaniline, N-benzylaniline, N-methyltoluidine, N,N,N'-trimethyl-p-phenylenediamine, N-cyclohexylaniline, and N-methyl-α-naphthylamine.

(c) When n=1, and Y is an aromatic group but not bonded to Ar:

Diphenylamine, phenyl naphthylamine, dinaphthylamine, ditoluylamine, and 4,4'-dichlorodiphenylamine.

(d) When n=1 and Y is bonded to Ar:

Carbazole, 3-chlorocarbazole, 3,6-dibromocarbazole, indole, isoindole, indoline, phenoxazine, phenothiazine, and 2-phenylbenzimidazole.

(e) When n=2:

4,4'-bis(monomethylamino)-diphenylmethane, 4,4'-bis(monoethylamino)diphenylmethane, 1,1[4,4'-bis(-monomethylamino)-diphenyl]ethane, 4,4'-bis(monobenzylamino)diphenylmethane, 4,4'-bis(phenylamine)diphenylmethane, 4,4'-bis(methylamino)-triphenylmethane, N,N'-dimethyl-p-phenylenediamine, N,N'-diphenyl-p-phenylenediamine, N,N'-(β-naphthyl)-p-phenylenediamine, and diindole.

Preferred aromatic amines are those which are easily melted together with the soluble polycondensate and can react in the molten state. But in order that they may be readily available and afford photoconductive resins of reduced coloration, they are especially preferably those of formula (2) in which Y is selected from the group consisting of a hydrogen atom, lower alkyl groups, a benzyl group, and a phenyl group, specifically at least one of aniline, toluidine, N-methylaniline, N-ethylaniline, N-benzylaniline, carbazole, diphenylamine, and 4,4'-bis(methylamino) diphenylmethane.

The above aromatic amine compounds are limited to those in which 1 to 2 hydrogen atoms are bonded to the nitrogen atom of the amino group. This is because when they contain 3 or more such hydrogen atoms, they easily react with the reactive groups of the soluble low-molecular-weight polycondensate, and the reaction product undergoes gellation and becomes insoluble. Some of the aromatic amine compounds, however, give improved sensitivity or film-forming ability when a part (generally not more than 30 mole%) of them is replaced by an aromatic amine compound in which at least 3, preferably 3 to 4, hydrogen atoms are bonded to the amino group. Examples of such aromatic amine compound are 4,4'-diaminodiphenylmethane, 4,4'-diaminodiphenyl ether, and p- or m-phenylenediamine.

(1-3) Co-condensation component

The utility of the photoconductive tertiary amino-containing resin can sometimes be improved further for certain applications by using a co-condensation component which reacts with the reactive groups of the polycondensate to the same degree as the aromatic amino compound in the preparation of the above photoconductive resin. The co-condensation component includes, for example, polynuclear aromatic hydrocarbons and phenolic compounds. The polynuclear aromatic hydrocarbon sometimes has an effect of increasing the sensitivity of the photoconductive resin, but since it is susceptible to coloration, it is properly chosen according to the desired usage. Preferred phenolic compounds are those containing at least 3 aromatic rings, such as anthracene, perylene, or phenanthrene. The anthracene is especially preferred. The mixing mole ratio of the polynuclear aromatic hydrocarbon to the aromatic amine compound is generally 0.1-3:1, preferably 0.1-1:1.

The phenolic compound as a co-condensation component sometimes has an effect of improving film-forming ability of the photoconductive resin and the compatibility of the aromatic amine compound with the binder polymer. Preferred phenolic compounds are phenol, o-cresol, m-cresol, p-cresol, mixed cresol, 3,5-xylenol, and t-butylphenol. The mixing molar ratio of the phenolic compound to the aromatic amine compound is generally 0.1-3:1, preferably 0.1-1:1.

(1-4) Preparation of the photoconductive tertiary amino-containing resin

It is known to some extent that a tertiary amino-containing resin can be obtained by condensation between the soluble low-molecular-weight polycondensate and the aromatic amine compound, as in the case of a reaction of aniline with a xylene-formaldehyde resin disclosed, for example, in K, O: Kogyo Kagaku Zasshi 58, 520 (1955) and 62, 129 (1959). However, it has been unknown that the reaction of the soluble low-molecular-weight polycondensate with a secondary amine of a diarylamine type such as carbazole or diphenylamine yields a tertiary amine preferentially, and thus gives a resin containing it.

The novel soluble aromatic tertiary amino-containing resin of this invention is prepared by reacting (1) a soluble low-molecular-weight polycondensate obtained by addition-condensation of a benzene compound containing at least one nitrogen-free electron donating nuclear substituent and at least two nuclearly substituted hydrogen atoms capable of methylol substitution by formaldehyde, with formaldehyde and/or its functional derivative, in which at least one of the benzene compound residues contains a pendant group of the following formula

wherein X is a hydroxyl group, an alkoxy group, an O-acyl group or a halogen atom, as a substituent bonded to the carbon atoms of the benzene ring in principle, with (2) an aromatic amine compound of the following formula

wherein Ar is an aromatic group, the group

is bonded to the nuclear carbon atom of the aromatic group, n is 1 or 2, Y is an aromatic group which is identical with or different from Ar or optionally forms a ring either directly or through a nitrogen, oxygen or sulfur atom, thereby to substitute the methylene group bonded to the carbon atom of the benzene ring for the hydrogen atom bonded to the nitrogen atom forming the amino group of the aromatic amine compound (2), and has good photoconductivity.

The ratio between the low-molecular-weight polycondensate (1) and the aromatic amine compound (2) used for preparing the photoconductive resin is in principle such that the content of the dimethylol ether group, the methylol group and/or their functional derivative of the polycondensate (1) is equal in equivalent weight to the content of the hydrogen atoms bonded to the nitrogen atom of the amino group, and in many cases, this ratio is preferred. It is not necessary however to adjust the ratio exactly to this standard, but according to the desired purposes, the ratio can be otherwise. For example, when it is desired to increase the amino group content of the photoconductive resin as much as possible, it is sometimes preferred to employ a method in which the aromatic amine compound (2) is fed in excess so that the dimethylol ether group, the methylol group and/or their functional derivatives of the polycondensate (1) may be used in the reaction with the amino group of the aromatic amine compound (2) as completely as possible, and after the reaction, the excess unreacted amine (2) is removed from the resulting photoconductive resin by distillation or re-precipitation. In this case, the amount of the aromatic amine compound (2) is generally 20 mole% to 300 equivalent% excess.

In some cases, the aromatic amine compound (2) is charged in an amount smaller than the equivalent weight in order that a part of the dimethylol ether group, the methylol group and/or their functional derivatives of the polycondensate (1) may be used in a substitution reaction with the ring carbon atoms of the aromatic amine (2) with or without the carbon atoms of the benzene ring of the polycondensate (1) in addition to being used in the reaction with the amino group of the amine (2), thereby to increase the molecular weight of the resulting photoconductive resin and to improve its softening point or film-forming ability. If, however, the amount of the aromatic amine compound fed is too small, the proportion of the photoconductive group of the photo-conductive resin decreases to cause a reduction is sensitivity. Furthermore, this tends to cause the gellation of the resulting resin by crosslinking during the reaction. Generally, therefore, it is preferred to use the aromatic amine compound in an amount at least half the equivalent weight.

Depending upon the type of the aromatic amine compound (2) and the reaction conditions, the difference between the substitution-reactivity of the reactive groups of the polycondensate (1) with the hydrogen atom bonded to the nitrogen atom of the amino group and that with the hydrogen atoms bonded to the nuclear carbon atoms on the aromatic nucleus sometimes becomes small, and the aforesaid gellation tends to occur. Hence, care is sometimes required in choosing the amount of the aromatic amine compound (2) and the reaction conditions.

The reaction between the polycondensate (1) and the aromatic amine compound (2) is promoted by using a catalyst. Generally, the catalyst is preferably an acid catalyst such as m-xylenesulfonic acid, methanesulfonic acid or toluenesulfonic acid. The amount of the catalyst is generally 0.001 to 20%, preferably 0.1 to 2%, based on the weight of the soluble low-molecular-weight polycondensate (2). The reaction can be carried out in the presence of an inert reaction solvent such as nitrobenzene or methyl benzoate. However, since it is necessary to separate the resulting photoconductive resin from the solvent after the reaction, it is generally advantageous to perform the reaction in the molten state while evaporating off the by-product water or if desired, evaporating off the unwanted unreacted reaction components. Preferably, the reaction is performed in an atmosphere of an inert gas such as nitrogen or argon in order to prevent the coloration of the resulting resin by oxidation. In some cases, the reaction can be carried out at reduced pressure.

The reaction of the aromatic amine compound (2) with the polycondensate (1) with or without the cocondensation component is carried out at a temperature of generally 50° to 300° C., preferably 120° to 230° C. The reaction time varies according to ther conditions such as the reaction temperature, but is generally 0.2 to 10 hours, preferably 1 to 4 hours.

The state of progress of the reaction can generally be traced by measuring the NMR spectrum or IR spectrum of the reaction mixture. In the case of the NMR spectrum, it can be confirmed by the state of the disappearance of an absorption ascribable to the proton of >NH in the aromatic amine (2) and an absorption ascribable to the proton of —CH$_2$O— in the aromatic amine (2) with the progress of the reaction. In the case of the IR spectrum, it can be confirmed by the reduction of a characteristic absorption ascribable to the stretching vibration of the bond of >N—H. Sometimes, it is seen by an infrared absorption spectrum, for example, that even after the reaction, a proton of the >NH type slightly remains in the resulting resin. This is presumably because the reaction of the methylol group and/or its functional derivatives with the carbon atoms on the aromatic ring of the aromatic amine (2) takes place competitively with the reaction of such groups with the —NH— group, and consequently, the —NH group partly remains in the resin, or a group of the benzyl type is rearranged from the tertiary amino group formed.

After the reaction, the resin formed can be used as a photoconductive resin composition for an electrophotographic sensitive layer without particularly purifying it but if desired, after adding a sensitizer or a binder resin of the types already described.

The resulting resin can, if desired, be purified, for example, by dissolving it in a solvent such as methyl ketone or chlorobenzene and pouring the solution into a non-solvent for the resin such as methanol to remove the unreacted matter, or by reducing the resulting resin to a powder or granule, and extracting it with a substance which is a non-solvent for the resin but a solvent for the unreacted materials (e.g., methanol) to remove the unreacted materials.

It is also possible to introduce a suitable amount of halogen into the aromatic group of the resulting resin by contacting it with a halogenating agent for substituting a halogen atom for the hydrogen atom on the aromatic ring, for example, bromine, chlorine, N-bromosuccinimide or sulfuryl chloride; or by reacting it with oleum to introduce a nitro group into a part of the aromatic group.

These resins subjected to post reactions can be used equally to the above-mentioned resins, and are included within the definition of the photoconductive tertiary amino-containing resins specified in the present invention.

(1-5) Properties of the photoconductive tertiary amino-containing resin

The photoconductive resin obtained by the process described above is a transparent amorphous solid resin which is colorless or colored generally to blue, green, yellow or brown. It has a softening point of 50° C. to a point at which it becomes infusible. Preferably, it has a softening point of 70° to 150° C. The resin is soluble in a wide range of organic solvents, and can be cast into films from its solutions in these solvents. Preferred solvents are those having a boiling point of 40° to 200° C., for example, ketones such as methyl ethyl ketone, acetone, methyl isobutyl ketone, and cyclohexanone, aromatic hydrocarbons such as toluene and xylene, halogenated hydrocarbons such as dichloromethane, tetrachloroethane and chlorobenzene, ethers such as tetrahydrofuran, dibutyl ether and anisole, esters such as ethyl acetate and butyl acetate, and amides such as dimethyl formamide, dimethyl acetamide and N-methylpyrrolidone.

The photoconductive resin used in this invention generally has a molecular weight, in terms of an inherent viscosity determined at 30° C. for a solution of the resin in N-methylpyrrolidone in a concentration of 0.5 g/100 ml., of 0.03 to 0.80, preferably 0.07 to 0.50. The amino group content of the resin is preferably 1 per 0.5 to 7 benzene nuclei forming the soluble polycondensate (1) and especially 1 per 0.6 to 4 benzene nuclei.

This amino group is bonded to the benzene ring forming the skeleton of (1) in the form represented by the following formula

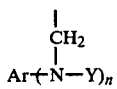 (4)

wherein Ar is an aromatic group, the group

is bonded to the carbon atom of the aromatic ring, n is 1 or 2, and Y is a hydrocarbon residue or a hydrogen atom, and optionally forms a ring together with Ar either directly or through a nitrogen, oxygen or sulfur atom, or is optionally bonded to the benzene ring B or C in formula (3) through a methylene group.

The amino group content can generally be determined easily by calculation from the nitrogen content of the photoconductive resin of this invention measured by an elemental analysis.

Sometimes, amino groups other than the tertiary amino groups mix in the photoconductive resin. As stated hereinabove, the amount of such other amino groups can be determined, for example, by an infrared absorption spectrum or NMR spectrum. Since the photoconductive resin of this invention contains various kinds of tertiary amino groups, it is difficult to determine the amount of the tertiary amino groups directly. For example, the proton in

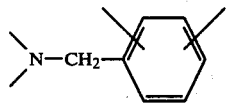

detected by an NMR spectrum is an effective tool for determination. A suitable method, such as an infrared absorption spectrum or mass spectrum, should be chosen according to the photoconductive resin obtained. Generally, a method relying on elemental analysis is simple and convenient, and widely applicable. An ultraviolet absorption spectrum and an ultraviolet visible fluorescent spectrum can also offer effective means of identifying the compounds.

(2) Sensitizers

In many cases, it is preferred to add a sensitizer to the electrophotographic sensitive layer of this invention in order to increase the sensitivity of the photoconductive amino-containing resin as a photoconductive material. Such sensitizers can be classified into optical sensitizers and chemical sensitizers. These two types of sensitizers can be used alone to produce an outstanding sensitizing effect, but preferably used together.

(2-1) Optical sensitizers

The optical sensitizers absorbs light having a longer wavelength than the sensitive wavelength limit of a main photosensitizer and transfers its energy to the photosensitizer thereby to excite the photosensitizer. This broadens the sensitive wavelength region of the photosensitizer to increase the proportion of that portion of the light from a light source which is utilized for sensitization, and thus to increase the overall sensitivity of the photosensitizer. Usually, dyes having an absorption in the visible region can be used as the optical sensitizers. In many cases, the optical sensitizers are effective even when added in very small amounts.

In the present invention, known optical sensitizers for organic photoconductors can be used. Specific examples of preferred optical sensitizers are described below.

(a) Triarylmethane-type compounds

Crystal Violet, Victoria Blue BH, Victoria Pure Blue BOH, Methyl Violet Pure Special, Malachite Green, Dianix Blue EB-E, Diacryl Turquoise Blue BG-E, Dianix Brilliant Red BS-E, Diacelliton Fast Pink R, Acid Violet 5B, Solar Cyanine 6B, Acid Violet 6B, Brilliant Green, Methyl Violet, Victoria Blue 6B, and Bictoria Blue 6B, and Victoria Blue.

(b) Anthraquinone-type compounds 4,5-dinitrochrysazin, 4,8-dinitroanthraquinone, 1,5-diaminoanthraquinone, 1-amino-2-phenoxy-4-hydroxyanthraquinone, 1-methylamino-anthraquinone, Turquoise Blue 776, Kayaset Blue 985, and Kayaset Blue 020.

(c) Cyanine-type compounds 3,3'-Diethyl-2,2'-thia-oxacarbocyanine iodide, 2-(p-dimethylaminostyryl)-3-ethyl benzothiazolium iodide, 1-carboxymethyl-1'-carboxyethyl-2,2'-quinocyanine bromide, and 1,1'-diethyl-2,4'-quinocyanine iodide.

(d) Rhodamine-type compounds

Rhodamine B, Rhodamine 6G, Rhodamine B Extra, and Sulfo-Rhodamine B.

(e) Xanthene-type compounds

Rose Bengal and Erythrosine.

(f) Thiazine-type compounds

Methylene Blue.

(g) Acridine-type compounds

Acridine Yellow and Acridine Orange.

(h) Quinoline-type compounds

Cryptocyanine and pinacyanol.

(i) Carbonyl-type compounds

Alizarin and Solway Ultrablue B.

From the standpoint of effects, dyes of the triarylmethane type are preferred. Depending upon the absorption wavelengths of these dyes, two or more of the optical sensitizers can be used in order to broaden the absorption area.

Some specific colors are undersired in certain uses of the photosensitive layer. Generally, blue to violet dyes having an absorption wavelength in the yellow to red regions are conveniently used from the standpoint of efficiency and appearance. Examples of these sensitizers are Crystal Violet, Kayaset Blue 985, and Victoria Pure Blue BOH. The amount of the optical sensitizer is usually 0.0001 to 20% by weight, preferably 0.01 to 15% by weight, based on the weight of the photoconductive resin.

(2-2) Chemical sensitizers

The chemical sensitizer increases photoconductivity by chemically reacting with a main photosensitizer during non-exposure and/or during exposure to facilitate the generation of carriers by light or the movement of such carriers.

Compounds heretofore known to be effective for the photoconductor containing a tertiary amine unit of formula (Ia) for example can generally be used as the chemical sensitizers in the present invention. Preferred chemical sensitizers are those which can mix with the photoconductive resin as a main photosensitizer to an extent of at least 0.1% by weight, preferably at least 1% by weight. These compounds can be divided roughly into compounds having the properties of an electron acceptor and halogen-containing organic compounds. The former include Lewis acids in the broad sense, and are preferably those capable of forming a charge-transfer complex with the aromatic amines (2). Accordingly, compounds based on aromatic compounds containing an electron attracting substituent, such as benzene, naphthalene, anthracene, fluorene, fluorenone or biphenyl are generally preferred. Examples of the electron attracting group are a nitro group, a carboxyl group or its derivatives, a cyano group, a halogen group, a sulfone group, a ketone group, an aldehyde group, and a sulfonic acid group or its derivatives. Chemical sensitizers having at least 1, preferably 2 to 4, electron attracting groups are preferred.

Of the above-exemplified substituents, the nitro group is preferred because of its great electron attracting property. However, polynitro compounds are generally colored, and many of them are strongly colored especially when forming a charge-transfer complex. In certain applications, this coloration may pose a problem. In such a case, a carboxyl group and its derivatives such as an anhydride group or ester group, and a cyano group are preferred. These compounds, either of high or low molecular weight, can be used if only they meet the requirement of compatibility with the photoconductive resin. Thus, aromatic nitro compounds, aromatic carboxylic acid or the derivatives thereof, and aromatic cyano compounds can be used as chemical sensitizers.

Examples of the aromatic nitro compounds are trinitrofluorenone, tetranitrofluorenone, (2,4,7-trinitro-9-fluorenylidene) malononitrile, nitroanthracene, dinitroanthracene, trinitroanthracene, nitroanthraquinone, dinitroanthraquinone, trinitroanthraquinone, o- or m-dinitrobenzene, dinitronaphthalene, nitrophenol, dinitrophenol, trinitrophenol, mononitrocatechol, dinitrocatechol, monochloro-mononitrophenol, monochlorodinitrophenol, mononitrocresol, and dinitrocresol.

Examples of the aromatic carboxylic acids or their derivatives include phthalic acid, tetrachlorophthalic acid, tetrabromophthalic acid, trimellitic acid, pyromellitic acid, naphthalene-1,8- or 2,3-dicarboxylic acid, benzophenonetetracarboxylic acid, anhydrides and esters of these acids, nitrobenzoic acid, dinitrobenzoic acid, trinitrobenzoic acid, monochloro-mononitrobenzoic acid, monochlorodinitrobenzoic acid, and dinitronaphthoic acid. Generally, the sensitizing effect becomes greater in the order of the esters, the acids, and the anhydrides, and therefore, the anhydrides are most preferred.

Examples of the aromatic cyano compounds are isophthalonitrile, phthalonitrile, 4-nitrophthalonitrile, tetracyanobenzene, and nitro benzonitrile.

Tetracyanoquinodimethane, tetracyanoethylene, chloranil, dichloroacetic acid, and maleic anhydride can also be cited.

Especially preferred chemical sensitizers are trinitrofluorenone, nitrobenzoic acid, nitrochlorobenzoic acid, nitrophenol, dinitrophenol, nitrochlorophenol, phenol, phthalic anhydride, trimellitic anhydride, naphthalene-1,8-dicarboxylic anhydride, naphthalene-1,4,5,8-tetracarboxylic acid, and naphthalene-1,4,5,8-tetracarboxylic dianhydride.

The sensitizing mechanism of the halogen-containing compound is not clear, but it is presumed that a halogen radical dissociated by the direct or indirect action of light will play an important role. Compounds containing at least one carbon-halogen bond in the molecular and meet the requirement of compatibility are chemically stable while dark at room temperature whether they are left alone or in the presence of the photoconductive resin or binder polymers. If these compounds can generate halogen radicals on exposure, they can be used as chemical sensitizers in this invention irrespective of their molecular weight. Preferably, the halogen in these compounds is chlorine, bromine or iodine. Chlorine and bromine are especially preferred. In view of the compatibility with the photoconductive resin and the sensitizing effect, aromatic halogen compounds, especially halogenated phenol and its derivatives, are preferred. Examples of these preferred species are halogenated bisphenols such as 2,2'-methylene-bis(4-chlorophenol), 2,2'-methylene-bis(3,4,6-trichlorophenol), 4,4'-methylene-bis(2-chlorophenol), and 4,4'-isopropylidene-bis(2,6-dibromophenol), mono-, di- or trichloro phenol, mono-, di- or tribromo phenol, chlorocresol, and halogenated phenolic resins formed between halogenated phenols and formaldehydes.

Examples of other halogen-containing compounds that can be used in this invention are polycarbonates or copolycarbonates derived from the above-exemplified halogenated bisphenols, epoxy resins containing the above halogenated bisphenol units, products obtained by adding the halogenated bisphenols to ethylene oxide or propylene oxide to form glycols, polyesters derived therefrom, halogenated phenyl esters of polyacrylic acid or polymethacrylic acid, copolymers of such a unit with other vinyl monomers, and hexachloro-p- or m-xylene. Other useful halogen-containing compounds include, for example, polyvinylidene chloride, polyvinyl chloride, polyvinyl bromide, copolymers containing these as a partial recurring unit, and halogenated paraffin compounds such as pentaerythrityl bromide.

Of the above-exemplified compounds, polymers can be used concurrently as binder polymers to be described.

We have found that polyarylmethane compounds of the following formula

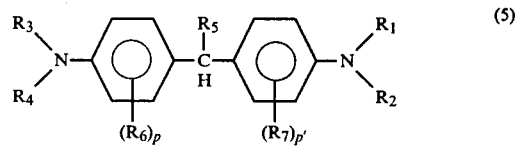

(5)

wherein $R_1$ to $R_4$ are identical or different, and represent an alkyl, alicyclic or aralkyl group containing 1 to 7 carbon atoms, and $R_5$ represents at least one of alkyl, alicyclic, aryl and aralkyl groups containing 1 to 7 carbon atoms, and

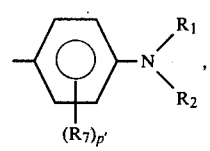

$R_6$ and $R_7$ are identical or different and represent a lower alkyl group containing 1 to 3 carbon atoms or a halogen groups, and p and p' represent an integer of 0 to 2, have an outstanding sensitizing effect on the photoconductive resins containing carbazole or its nucleus-substituted derivatives, although their sensitizing mechanism is not entirely clear.

These compounds themselves contain a unit of formula (Ia) and become photoconductive when combined with the halogen-containing organic compounds described above. But when they are combined with the photoconductive resin containing carbazole, they produce a very good sensitizing action even in the complete absence of the halogen-containing organic compound as sensitizer.

The chemical sensitizer must be added in a larger amount than the optical sensitizer in view of its action. The amount of the chemical sensitizer differs according, for example, to the proportion of the photoconductive group of type (Ia) in the photoconductive resin or the molecular weight of the sensitizer, but is generally 0.1 to 100% by weight, preferably 1 to 70% by weight, based on the weight of the photoconductive resin.

When the amount of the chemical sensitizer is too small, its effect is reduced, and on the other hand, when it exceeds a certain limit, the effect no longer increases. Furthermore, since the addition of the chemical sensitizer generally aggravates the properties of the photosensitive layer as a coating, it is preferred to determine the most feasible amount experimentally according to the desired use.

(iii) Binder polymers

The photoconductive resin used in the photosensitive layer of this invention has film-forming ability, but in many cases, its molecular weight is not so high. In order therefore to obtain a photosensitive layer having superior flexibility, it is frequently necessary to add a binder polymer.

Generally, with increasing amount of the binder resin, the sensitivity of the photosensitive layer somewhat decreases in many cases. The amount of the binder polymer should desirably be as small as necessary. Generally, the amount of the binder polymer is 0.05 to 1.5 parts, preferably 0.1 to 1 parts, based on the weight of the photoconductive resin.

Preferably, polymers used for this purpose are well soluble in at least one of the good solvents for the photoconductive resin which are described hereinabove. Any of polycondensates, poly-addition type polymers, ring-opening polymerized polymers and vinyl type polymers can be used for this purpose so long as they have a softening point of at least 60° C., can form films having superior flexibility and are compatible with the photoconductive resin to an extent at least to give translucent films.

Examples of suitable binder polymers are polycondensates, for example, amorphous saturated copolyesters derived from an acid component such as terephthalic acid, isophthalic acid, phthalic acid or adipic acid and a glycol component such as ethylene glycol, propylene glycol, neopentyl glycol or tetramethylene glycol, oil-modified alkyd resins, bisphenol A type polycarbonates and phenoxy resins, and epoxy resins, polyaddition-type polymers such as polyurethane resin containing aliphatic polyesters as a solft segment, vinyl-type polymers such as polystyrene, polyacrylates, polymethacrylates, polyvinylacetate, polyvinyl chloride, and copolymers containing any of these as one component, and ring-opening polymerized polymers such as polyepichlorohydrin. For certain applications, the photosensitive layer is required to be transparent. In such a case, it is necessary to choose resins which have particularly good compatibility. As stated previously, some of the halogen-containing polymers concurrently act as sensitizers. These binder polymers can be used in combination of two or more.

(iv) Preparation of electrophotographic sensitive layer

Generally, the electrophotographic sensitive layer of this invention is prepared by dissolving predetermined amounts of the photoconductive resin with or without the sensitizer and the binder polymer in an organic solvent, coating the resulting solution on a support, and then drying it. For certain applications, finely divided silica, for example, is added in order to impart graphic properties or a mat finish to the photosensitive layer.

The dissolution of the above components in solvent can be performed either by dissolving a mixture of these component, or dissolving these components in optional order in a solvent, or dissolving them separately and mixing the resulting solutions. The suitable concentration of the solute of the solution differs according to such factors as the type of the solute components, or the method of coating, but is generally, 5 to 80% by weight, preferably 10 to 60% by weight.

The method of coating the resulting coating solution on a support may be any method capable of forming a uniform photosensitive layer. Generally, wire bar coating, knife coating, Wheeler coating, roll coating, spray coating, and brush coating are employed.

When the solvent remains in the resulting photoconductive layer, inconveniences occur frequently, resulting in reduced dark resistance, reduced photoconductivity, or the unstability of photo-conductivity. Hence, it is preferred to perform the drying as completely as possible.

Generally, the photoconductivity is better with smaller thickness of the photoconductive layer, but if it is too low, electrification voltage caused, for example, by corona discharge tends to become lower. Preferably, therefore, the thickness which will give the best image is experimentally determined. Usually, the thickness of the photoconductive layer is 2 to 30 microns, preferably 4 to 15 microns.

The support for forming the photosensitive layer is suitably chosen from metal plates such as aluminum, zinc, copper, nickel or iron, paper sheets, plastic films or glass sheets. When the support is a good electric insulator, the surface to which the photosensitive layer is formed should be subjected to a treatment for rendering it electrically conducting. Any methods of treatment can be employed so long as they do not adversely affect the photoconductive sensitive layer and can provide a surface resistivity of not more than $10^{10}$ ohms/cm$^2$, preferably not more than $10^9$ ohms/cm$^2$.

As previously stated, the use of the organic photoconductors of the present invention for photosensitive layers is suitable for obtaining transparent or transluent electrophotographs, and therefore, plastics films, paper sheets and glass sheets are frequently used as bases. In many cases, therefore, these bases require treatment to form a transparent conducting layer thereon. For example, this treatment can be performed by a method comprising coating or impregnating a polymeric electrolyte such as poly-N-trimethylbenzyl ammonium chloride or poly(sodium styrenesulfonate) on or in the surface of a base material thereby to form a conducting layer; a method comprising vacuum-depositing a metal such as aluminum, copper, gold or palladium in a thin layer on the base surface; a method comprising applying an oxide of indium oxide, for example, to the base surface by vacuum evaporation or spattering, and then increasing its transparency by oxidation, for example; or a method forming a vacuum-deposited layer of copper and converting it to a copper iodide layer using iodine. The formation of a conducting layer using an electrolyte is most inexpensive, and the transparency of the layer is good. But since it is ionizing conduction, the resistivity value of the conducting layer varies according to the degree of moisture absorption. The indium oxide layer or the copper iodide layer has good transparency and conductivity, but since they require a complicated procedure for preparation, the cost of production is high. The ultrathin metal coating is cheaper than the indium oxide layer or the copper iodide layer because no post-treatment is required, but suffers from reduced transparency. According to the desired use, a suitable method is chosen.

(v) Characteristics and utility of the electrophotographic sensitive layer

The amino-containing photoconductive resin used as a photoconductive base material of the electrophotographic sensitive layer of the present invention can be obtained from a raw material commercially available very easily at low cost by a very simply reaction, and has sensitivity comparable to the conventional low-molecular-weight and polymeric organic conductors. By combining it with a suitable sensitizer and/or binder polymer, there can be obtained electrophotographic sensitive layers having superior utility according to the requirements of end uses, which have superior flexibility or transparency or superior light transmission in a near ultraviolet region in the preparation of a diazo duplicate as a second master.

Accordingly, the electrophotographic sensitive layer of the present invention can be used in a very wide range of applications. For example, a photosensitive sheet formed by providing the photosensitive layer on a plastic film can be used as a microfilm, a microfiche or a second master sheet obtained by directly enlarging a microfilm, a transparent sheet for overhead projectors, or slide projectors. A photosensitive paper prepared by using paper as a base can be used as coated paper copy for business offices, and a photosensitive paper for a second master.

Furthermore, when the photosensitive layer is formed on a metal plate, an image of a drawing can be formed thereon in place of scribing used at the time of metal cutting.

Furthermore, a transfer photosensitive drum for plain paper copying can be produced by forming the photosensitive layer on a metal drum. According to the present invention, electrophotographic sensitive layers having a sensitivity, in terms of a half-decay exposure amount under a white light from a tungsten-filament lamp as a light source, of 2000 to 10 lux-sec can be easily obtained. This sensitivity is fully feasible when good sensitizers are chosen.

The following Examples and Comparative Examples illustrate the present invention in greater detail.

Before going into the Examples, we shall give a description of the materials and test methods used in these examples.

[I] Soluble low-molecular-weight polycondensate (1) Xylene/formaldehye resin

Preparation

A reactor was charged with 106 g of m-xylene, 129 g of a 37% aqueous solution of formaldehyde (formalin) and 98% by weight sulfuric acid, and the reaction was started at 95° C. with stirring. The reaction was performed for 7 hours, and the temperature finally rose to 104° C. After the end of the reaction, the aqueous phase at the bottom (sulfuric acid phase) was separated, and the resulting oil phase was steam-distilled at 100° C. at atmospheric pressure. 107 g of a xylene/formaldehyde resin was obtained.

Characteristics

Weight-average molecular weight: about 390

Oxygen content: about 8.7% by weight

Acid number: 0.2

Viscosity: 74 centipoises (determined for a toluene solution with a xylene resin concentration of 80% by weight)

Composition of functional groups

The NMR spectrum of the xylene/formaldehyde resin was measured using deuterochloroform ($CDCl_3$) as a solvent, and the following peaks were confirmed.

|  | (ppm) |  |
|---|---|---|
| (1) Ar—$CH_3$ | 2.26 | (m) |
| (2) Ar—$CH_2OCH_3$ | 3.32 | (m) |
| (3) Ar—$CH_2$—Ar | 3.84 | (s) |
| (4) Ar—$CH_2(OCH_2)_n$Ar<br>Ar—$CH_2OH$ | 4.5 | (m) |
| (*In (1) to (4), Ar represents an aromatic ring.) | | |
| (5) Phenyl proton | 7 | (m) |

In the peak of (4) above, the peaks of Ar—$CH_2(OCH_2)_n$Ar and Ar—$CH_2OH$ overlap and are broad. Thus, Ar—$CH_2OH$ was acetylated to Ar—$CH_2OOCCH_3$. Measurement of its NMR spectrum shows that Ar—$CH_2OOCCH_3$ was 1.8 ppm (Ar—$CH_2OOCCH_3$, 4.8 ppm). These peaks were separated from the peak of Ar—$CH_2(OCH_2)_n$Ar', and the composition of the functional groups calculated for each of the peaks was as follows:

|  | (%) | (Moles of each functional group per benzene ring) |
|---|---|---|
| Ar—$CH_2OH$ | 2.2 | 0.10 |
| Ar—$CH_2OCH_3$ | 6.7 | 0.21 |
| Ar—$CH_2$—Ar | 4.2 | 0.48 |
| Ar—$CH_2(OCH_2—_n$Ar | 9.8 | 0.32 |

(2) Highly condensed xylene/formaldehyde resin

This resin was obtained by further condensing the xylene/formaldehyde resin (1) above.

Characteristics

Weight-average molecular weight: 1300

Acid number: below 7

Softening point (ring-and-ball method): 105°–125° C.

| Composition of the functional groups | |
|---|---|
| Functional groups | Moles of functional group per benzene ring |
| Ar—CH$_2$—Ar | 0.70 |
| Ar—CH$_2$(OCH$_2$)$_n$Ar | 0.17 |

(3) Resol resin

This resin was obtained by condensing mixed cresol (m:p=6:4) and formaldehyde using sodium hydroxide as a catalyst.
Characteristics
Weight-average molecular weight: 270
Viscosity: 0.45 poises
Non-volatile content: 55% (135° C., 7 hrs.)
Specific gravity (25° C.): 1.020

| Composition of the functional groups | |
|---|---|
| Functional groups | Moles of each functional group per benzene ring |
| Ar—CH$_2$—Ar | 0.4 |
| Ar—CH$_2$OH | 0.5 |

[II] Binder (a) Vinyl acetate resin
This resin was obtained by polymerizing vinyl acetate.
Characteristics
Weight-average molecular weight: 1050
Volatile matter: below 3% by weight
Viscosity: 1200 centipoises when determined at 30° C. for a 50% by weight methanol solution of the resin
Transparency: 95% determined for a 10% methanol solution at 480 m$\mu$
Apparent density: 0.78
Specific gravity (25° C.): 1.20
Softening point: 55° C.
Melting point: 87° to 88° C.
Melt viscosity (170° C.): 1.47×10$^3$ centipoises (b) Acrylic resin
This resin was obtained by polymerizing methyl methacrylate, butyl methacrylate and acrylic acid in a weight ratio of 20:778:1.
Characteristics
Acid number: 3.7
Weight average molecular weight: 2500
Solids content: 49.8% by weight (c) Polycarbonate resin
This was a commercially available polycarbonate obtained from bisphenol A (4,4'-dihydroxydiphenyl-2,2-propane) and phosgene.
Characteristics
Weight-average molecular weight: about 35,000
Specific gravity: 1.4
Oxidation initiation temperature: 300° C.

(e) Ester resin
This resin was obtained by copolycondensing an acid component consisting of 46 mole% of terephthalic acid and 54 mole% of isophthalic acid and a glycol component consisting of 45 mole% of ethylene glycol and 55 mole% of neopentyl glycol.
Characteristics
Weight-average molecular weight: about 1700
Specific gravity: 1.26
Inherent viscosity: 0.53 when determined at 30° C. for a solution of 0.5 g of the ester resin dissolved in 100 ml. of a mixture of phenol and tetrachloroethane (6:4)
Softening point: 163° C.

(e) Polystyrene resin
This was a commercially available styrene resin obtained by polymerizing a styrene monomer, and had a weight average molecular weight of about 100,000 and a density of 1.045.

(f) Vinyl chloride copolymer
This resin was obtained by copolymerizing 91 mole% of vinyl chloride, 3 mole% of vinyl acetate and 6 mole% of vinyl alcohol.
Characteristics
Weight-average degree of polymerization: about 420
Apparent density: 0.65
Volatile content: 3%
Solution viscosity: 220 centipoises determined for a 20% solution of a 1:1 mixture of methyl isobutyl ketone and toluene at 25° C.

(g) Alkyd resin
This is a commercially available modified alkyd resin which was prepared by reacting glycerin and coconut oil to form a monoglyceride which was then reacted with phthalic anhydride. A 60% xylene solution of this resin had a specific gravity of 1.02, an acid number of 3, and a viscosity (Gardner) of V - Y.

[III] Supports

The following materials were used as supports on which to form the electrophotographic sensitive layer.

(a) Aluminum plate
An aluminum plate having a thickness of 300 microns whose surface was polished with 1000 mesh emery.

(b) Tracing paper rendered electrically conducting
A sheet of tracing paper for general engineering drawings was immersed in a 10% aqueous solution of polyvinylbenzyltrimethyl ammonium chloride, and dried. Both surfaces of the tracing paper thus had a coating of polyvinylbenzyltrimethyl ammonium chloride at a rate of 2 g/m$^2$. This paper will be referred to as "T-Paper".

(c) Polyethylene terephthalate film rendered electrically conducting
A 100$\mu$-thick biaxially oriented polyethylene terephthalate film was immersed in a 10% aqueous solution of polyvinyltrimethyl ammonium chloride and dried. Both surfaces of the film thus had a coating of polyvinylbenzyltrimethyl ammonium chloride at a rate of 2 g/m$^2$. This film will be referred to as "PET film".

(d) Metal-deposited film
Metallic indium was vacuum-deposited on a 75$\mu$-thick biaxially oriented polyethylene terephthalate film, and then air oxidized to form a transparent coating. It had a transmittance at 480 m$\mu$ of 80% and a surface resistivity of about 400 ohms/cm$^2$.

[IV] Preparation of specimens for measurement of photosensitive characteristics

The soluble low-molecular-weight polycondensate, the binder and chemical sensitizer shown in each of the Examples were dissolved in the indicated amounts in each of the solvents shown in the Examples. A 1% by weight dimethyl formamide solution of an optical sensitizer was prepared, and mixed with the above solution, followed by good stirring. The resulting solution was coated on a support by means of a Wheeler coater or a wire bar, and dried at 70° C. for 15 hours to form a sensitive layer having a thickness of about 7 microns on the support.

[V] Method for measuring the photosensitive characteristics

A voltage of −6 KV was applied to a square specimen with one side measuring about 10 cm using a corona discharger of the corotron type at a rate of 5 meters/min. The surface potential of the specimen was then measured by a high level surface potentiometer. The high level surface potentiometer was connected to a recorder which recorded the potential measured. The light source used was a 30 W tungsten-filament lamp unless otherwise indicated. It was fixed at a position 49 cm away from the specimen. The illumination intensity of the lamp at that position was 50 lux.

The half-decay exposure was calculated from the following equation.

$$\text{Half-decay exposure } (E_{50}) = L \times t \text{ (lux. sec)}$$

An electric charge was applied to the specimen by corona discharge in a darkroom, and its potential (Vo) was read after a lapse of 35 seconds. At the end of this 35-second period, light (with a illumination intensity of L lux) was irradiated onto the specimen from a tungsten-filament lamp. The time (t seconds) until the potential (Vo) reached Vo/2 was read.

[VI] Method of evaluating print images

After measuring the half-decay exposure ($E_{50}$) in a darkroom, a corona charge of −6 KV was applied to the entire surface of the specimen at a rate of 5 m/min. The specimen was exposed imagewise using a test chart to the light from a 30 W tungsten-filament lamp which had an illumination amount 4 times as large as the half-decay exposure. The exposed specimen was developed by liquid development or dry development described below.

(1) Liquid development

The exposed specimen was dipped for several seconds in a dispersion of a toner (particle size 0.1 to 1.0 micron). The toner dispersion had been prepared by well kneading a mixture consisting of 15 g of Pentarol 20 (trademark), 15 g of a copolymer of lauryl methacrylate and styrene (molar ratio of 95:5; weight average molecular weight of about 10,000), 150 g of cab carbon black and 15 g xylene, and dispersing the mixture in 3 liters of iso-paraffin ($C_9$–$C_{15}$) using ultrasonic oscillation. The Pentarol 20 is a phenol-modified pentaerythritol ester of rosin (with an acid number of 10, a specific gravity at 20° C. of 1.09, and a melting point of 110° to 120° C.).

(2) Dry development (magnetic brush development)

200 Parts by weight of reduced iron powder with a size of 150 to 300 mesh was mixed with 5 parts by weight of a toner consisting of 1 part by weight of a styrene/butadiene copolymer, 0.05 part by weight of polystyrene, 0.1 part by weight of carbon black and 0.18 part by weight of oil black which had been melt mixed, cooled and pulverized to an average particle size of 10 microns. (The toner used had a particle size of 5 to 25 microns.) The resulting mixture was adhered to a rod magnet, and contacted frictionally with the exposed specimen to develop it.

The resulting images were evaluated on the following scale.

Excellent: Very clear print images were obtained.
Good: Despite some defects, the print images were substantially satisfactory.
Poor: Much fog occurred, and the images were unclear; or no print image was observed.

EXAMPLE 1

(1) Preparation of a soluble aromatic tertiary aminocontaining resin

A 100 ml three-necked flask was charged with 17 g of the xylene/formaldehyde resin, 16.7 g (0.1 mole) of carbazole and 0.17 g of 2,4-dimethylbenzenesulfonic acid (to be referred to as m-xylenesulfonic acid) as a catalyst, and they were reacted at 200° C. in a stream of nitrogen. The reaction product was dissolved in 50 ml. of toluene at room temperature. The solution was added to 1000 ml. of stirred methanol in a mixer. The precipitate obtained was separated by filtration, and dried at 70° C. and 1 mmHg abs. for 15 hours to afford 25 g of a pale green white tertiary amino-containing resin which had the following characteristics.

Melting point: 135° C.
Inherent viscosity: 0.26
N content: 4.16% by weight
Aromatic amino group content: 0.70 per benzene ring
NMR spectrum: A peak (12.3 ppm) base on >NH of carbazole was no at all observed.

(2) Formation of a photoconductive layer and the measurement of its characteristics 2 g of the tertiary amino-containing resin obtained in (1) above was dissolved in 10 ml. of chlorobenzene at 20° C. to form a solution.

On the other hand, metallic indium was vacuum deposited on the surface of a polyethylene terephthalate film having a thickness of 75 microns and an area of 10 $cm^2$, and then air oxidized to form a transparent conductive film having a resistivity of 400 ohms/$cm^2$.

The solution obtained was coated on the surface of this film using a Wheeler coater, and dried at 70° C. for 15 hours to form a photosensitive layer having a thickness of 7 microns.

The half-decay exposure ($E_{50}$) of this photosensitive layer, as measured by using light with an illumination intensity 10000 lux from a 300-W tungsten-filament lamp, was $1.8 \times 10^4$ lux.sec. After a lapse of one month, the coating still adhered to the polyethylene terephthalate film, and no precipitate was seen to occur on the surface, and the photoconductive layer had a transparency of more than 70%.

COMPARATIVE EXAMPLE 1

10 g of polyvinyl carbazole (Luvican M-170, a product of BASF) was pulverized and dissolved in 100 ml. of methylene chloride, and re-precipitated with 1000 ml. of purified methanol, followed by drying. This procedure was repeated thrice to purify the polyvinyl carbazole. One gram of the purified polyvinyl carbazole was dissolved in 10 ml. of chlorobenzene to form a 10% solution.

In the same way as in Example 1, the solution was coated on the aluminum plate to form a coating. The half-decay exposure ($E_{50}$) of this coating, measured in the same way as in Example 1, was $1.6 \times 10^4$ lux.sec.

The resulting coating had many cracks and was susceptible to breakage.

When the polyvinyl carbazole solution was coated on the transparent conducting polyethylene terephthalate film in the same way as in Example 1, the photosensitive coating peeled off, and it was impossible to measure the photosensitive characteristics of the coating and to evaluate print images.

EXAMPLES 2 TO 18

600 mg of the tertiary amino-containing resin obtained in Example 1, (1), the binder and the chemical sensitizer shown in Table 1 were mixed with each of the solvents shown in Table 1 to form a solution. The solution was mixed with a separately prepared 1% by weight dimethyl formamide solution of each of the optical sensitizers shown in Table 1 with stirring at room temperature. The mixture was coated on each of the supports shown in Table 1 using a rotary coater, and dried to form a photosensitive layer having a thickness of 7 microns.

The half-decay exposure ($E_{50}$) of the photosensitive layer and the quality of print images, were determined, and the results are shown in Table 1.

Table 1

| Example | 2 | 3 | 4 | 5 | 6 | 7 |
|---|---|---|---|---|---|---|
| Tertiary amino-containing resin (mg) | 600 | 600 | 600 | 600 | 600 | 600 |
| Solvent (ml.) | N-Methylpyrrolidone (3) | Methylethyl ketone (3) | Methylethyl ketone (3) | Methylethyl ketone (3) | Methylethyl ketone (3) | Methylethyl ketone (3) |
| Binder (mg) | Ester resin (400) | Ester resin (100) | Ester resin (100) | Ester resin (100) | Ester resin (100) | Ester resin (100) |
| Solvent (ml.) | N-Methylpyrrolidone (2.0) | Methylethyl ketone (0.50) | Methylethyl ketone (0.50) | Chlorobenzene (0.50) | Methylethyl ketone (0.50) | Methylethyl ketone (0.50) |
| Chemical sensitizer (mg) | 1,4,5,8-Naphthalenetetracarboxylic acid (300) | Bis-(4-dimethylaminophenyl) methane (200) | Bis-(4-dimethylamino-3-bromophenyl) methane (200) | 4-Chloro-3-nitrobenzoic acid (100) | Trimellitic anhydride (100) | Tris-(4-dimethylaminophenyl) methane (200) |
| Solvent (ml.) | N-Methylpyrrolidone (3.0) | Methylethyl ketone (1.0) | Methylethyl ketone (1.0) | Methylethyl ketone (1.0) | Methylethyl ketone (1.0) | Chlorobenzene (1.0) |
| Optical sensitizer (mg) | — | Crystal Violet (0.5) | Crystal Violet (0.5) | Crystal Violet (0.5) | Crystal Violet (0.5) | Crystal Violet (0.5) |
| Support | Al | T-paper | Al | Al | Al | Al |
| Half-decay exposure ($E_{50}$) (lux.sec) | 80 | 163 | 130 | 360 | 290 | 98 |
| Evaluation of print images | Excellent | Excellent | Excellent | Excellent | Excellent | Excellent |

| Example | 8 | 9 | 10 | 11 | 12 | 13 |
|---|---|---|---|---|---|---|
| Tertiary amino-containing resin (mg) | 600 | 600 | 600 | 600 | 600 | 600 |
| Solvent (ml.) | Methylethyl ketone (3) | Methylethyl ketone (3) | Methylethyl ketone (2) | Methylethyl ketone (3) | Chlorobenzene (3) | Methylethyl ketone (3) |
| Binder (mg) | Ester resin (100) | Ester resin (100) | Ester resin (100) | Polystyrene (100) | Polystyrene (100) | Polycarbonate (100) |
| Solvent (ml.) | Methylethyl ketone (0.50) | Methylethyl ketone (0.50) | Methylethyl ketone (0.50) | Methylethyl ketone (0.50) | Methylethyl ketone (0.50) | Methylethyl chloride (0.50) |
| Chemical sensitizer (mg) | 1,1-Bis-(4-N,N'-dibenzylaminophenyl) butane (200) | (*1) (200) | 2,2'-Methylenebis(4-chlorophenol) (200) | Bis-(4-dimethylaminophenyl) methane (200) | Bis-(4-dimethylaminophenyl) methane (200) | Bis-(4-dimethylaminophenyl) methane (200) |
| Solvent (ml.) | Chlorobenzene (1.0) | Chlorobenzene (1.0) | Chlorobenzene (1.0) | Chlorobenzene (1.0) | Chlorobenzene (1.0) | Methylethyl ketone (1.0) |
| Optical sensitizer (mg) | Crystal Violet (0.5) | Crystal Violet (0.5) | Crystal Violet (0.5) | Crystal Violet (0.5) | Crystal Violet (0.5) | Crystal Violet (0.5) |
| Support | Al | Al | Al | T-paper | Al | Al |
| Half-decay exposure ($E_{50}$) lux.sec. | 228 | 445 | 553 | 163 | 104 | 169 |
| Evaluation of print images | Excellent | Excellent | Excellent | Excellent | Excellent | Excellent |

| Example | 14 | 15 | 16 | 17 | 18 | 19 |
|---|---|---|---|---|---|---|
| Tertiary amino-containing resin (mg) | 600 | 600 | 600 | 600 | 600 | 500 |
| Solvent (ml.) | Methylethyl ketone (3) | Methylethyl ketone (3) | Methylethyl ketone (3) | Methylethyl ketone (3) | Methylethyl ketone (3) | N-Methylpyrrolidone (5) |
| Binder (mg) | Ester resin (100) | Ester resin (100) | — | — | — | — |
| Solvent (ml.) | Methylethyl ketone (0.50) | Methylethyl ketone (0.50) | | | | |
| Chemical | 4-Nitrophtha- | 2,4-Dinitro- | 2,4,7-Tri- | (*1) | (*2) | 1,4,5,8- |

Table 1-continued

| sensitizer (mg) | lic acid (200) | benzoic acid (200) | nitrofluo-renone (300) | (300) | (300) | Naphthalene-tetracarbo-xylic acid (100) |
|---|---|---|---|---|---|---|
| Solvent (ml.) | Methylethyl ketone (1.0) | Methylethyl ketone (1.0) | Methylethyl ketone (6) | Methylethyl ketone (1.5) | Tetra-hydrofuran (6.0) | N-Methylpyr-rolidone (1.0) |
| Optical sensitizer (mg) | Crystal Violet (0.5) | Crystal Violet (0.5) | Crystal Violet (50) | Crystal Violet (0.5) | Crystal Violet (0.5) | — |
| Support | Al | Al | Al | Al | Al | Al |
| Half-decay exposure ($E_{50}$) lux.sec | 620 | 480 | 14 | 870 | 1400 | 400 |
| Evaluation of print images | Excellent | Excellent | Excellent | Excellent | Excellent | Excellent |

Note:

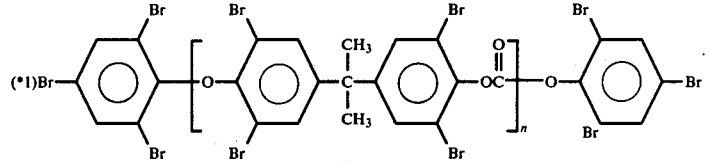

(n is 7 on an average)

(*2)A copolymer of vinylidene chloride and vinyl chloride (1:1) having a weight-average molecular weight of about 100,000 and a melting point of 85° C.

EXAMPLE 20 AND COMPARATIVE EXAMPLE 2

A 100 ml. three-necked flask was charged with 10 g of the highly condensed xylene/formaldehyde resin 6.8 g (0.041 mole) of carbazole and 0.10 g of m-xylenesulfonic acid, and the reaction was carried out for 4 hours at 200° C. in an atmosphere of nitrogen. The resulting product was dissolved in 25 ml. of toluene at room temperature, and the solution was added to 800 ml. of stirred methanol in a mixer. The precipitate obtained was separated by filtration, and dried at 70° C. and 1 mmHg abs. for 15 hours to afford 9.5 g of a white tertiary amino-containing resin having the following characteristics.

Melting point: 115° C.

Inherent viscosity: 0.12
N content: 2.50%

A peak (12.3 ppm) based on the >NH of carbazole was not at all observed by an NMR spectrum analysis.

The photosensitive characteristics of the resulting resin were compared with those of a mere mixture of benzyl carbazole of the following formula

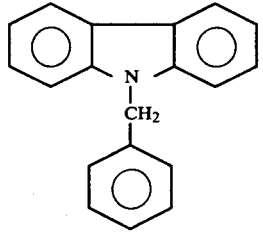

and the highly condensed xylene/formaldehyde resin (Comparative Example 2) which had the same nitrogen content as the above tertiary amino-containing resin. The results are shown in Table 2.

Table 2

| Example | Example 20 | Comparative Example 2 |
|---|---|---|
| Photoconductive resin (mg) | Tertiary amino-containing resin (600) | Mixture of benzyl carbazole (259) and the highly condensed xylene/formaldehyde condensate (300) |
| Solvent (ml.) | Chlorobenzene (3) | Chlorobenzene (3) |
| Binder (mg) | Ester resin (100) | Ester resin (100) |
| Solvent (ml.) | Chlorobenzene (0.5) | Chlorobenzene (0.5) |
| Chemical sensitizer (mg) | Bis-(4-dimethyl-aminophenyl) methane (200) | Bis-(4-dimethylaminophenyl) methane (200) |
| Solvent (ml.) | Chlorobenzene (1.0) | Chlorobenzene (1.0) |
| Optical sensitizer | Crystal Violet | Crystal Violet |
| Support | Aluminum plate | Aluminum plate |
| Half-decay exposure ($E_{50}$) (lux. sec) | 330 | Not sensitive even when the light source was made five times more bright |
| Evaluation of print images | Excellent | poor |

EXAMPLES 21 TO 31

In the same manner as in Example 1, (1), the reaction was carried out at the temperatures and for the times indicated in Table 3 using the various aromatic amines shown in Table 3 instead of the carbazole. The yield, melting point, inherent viscosity, and N content of the resulting tertiary amino-containing resins, were measured, and the results are shown in Table 3.

0.6 g of each of the resulting tertiary amino-containing resins was dissolved in 3 ml. of methylethyl ketone. 0.1 g of the ester resin was dissolved in 0.5 ml. of methyl ethyl ketone. Furthermore, 0.2 g of 2,2'-methylenebis(4-chlorophenol) was dissolved in 1 ml. of methyl ethyl ketone. On the other hand, 0.5 mg of Crystal Violet was dissolved in 50 ml. of dimethyl formamide.

These solutions were mixed at room temperature with stirring, and the mixture was coated on each of the supports shown in Table 3 using a Wheeler coater, and dried at 70° C. for 15 hours to form a photosensitive layer having a thickness of about 7 microns.

The half-decay exposure of each of the specimens obtained was measured, and the resulting print images were evaluated. The results are shown in Table 3.

Table 3

| Example | 21 | 22 | 23 | 24 | 25 |
|---|---|---|---|---|---|
| Xylene/formaldehyde resin (g) | 10 | 20 | 5 | 10 | 20 |
| Aromatic amine (g) | Diphenylamine (10) | Aniline (26.7) | Benzyl aniline 84.4) | Methyl aniline (10.28) | α-Naphthylamine (9.2) |
| m-Xylene sulfonic acid (g) | 0.1 | 0.2 | 0.05 | 0.1 | 0.2 |
| Reaction temperature (°C.) | 200 | 200 | 200 | 200 | 200 |
| Reaction time (hrs.) | 2 | 3 | 2 | 3 | 2 |
| Yield (g) | 10.7 | 24 | 6 | 10 | 8 |
| Melting point (°C.) | 68–70 | 128 | 30 | 65 | 59–61 |
| Inherent viscosity | 0.09 | 0.13 | 0.08 | 0.10 | 0.07 |
| Nitrogen content (%) | 3.75 | 4.29 | 3.75 | 4.69 | 2.60 |
| Support | Al | T-paper | Al | Al | Al |
| Half-decay exposure ($E_{50}$) lux.sec | 228 * | 390 | 293 | 293 | 780 |
| Evaluation of the print images | Excellent | Excellent | Excellent | Excellent | Excellent |

*: When only the xylene/formaldehyde resin was used, this value was $3.5 \times 10^4$ (as determined by the same method as in Example 1).

| Example | 26 | 27 | 28 | 29 | 30 |
|---|---|---|---|---|---|
| Xylene/formaldehyde resin (g) | 10 | 0 | 10 | 20 | 20 |
| Aromatic Indol amine (g) | N,N'-Di- (7.5) | Phenophenyl-p-phenylenediamine (12.5) | N,N-Dithiazine (12.8) | o-aminodiphenylmethane (5.1) Carbazole (17.1) | Toluidine (6.85) |
| m-Xylene sulfonic acid (g) | 0.1 | 0.1 | 0.1 | 0.2 | 0.2 |
| Reaction temperatures (°C.) | 200 | 200 | 200 | 200 | 200 |
| Reaction time (hrs.) | 2 | 2 | 2 | 2 | 2 |
| Yield (g) | 2.3 | 12.9 | 15.6 | 36 | 18.5 |
| Melting point (°C.) | 74 | 80–82 | 100 | 73–75 | 96–98 |
| Inherent viscosity | 0.08 | 0.07 | 0.10 | 0.07 | 0.10 |
| Nitrogen content (%) | 5.13 | 5.58 | 4.26 | 5.03 | 3.68 |
| Support | Al | Al | Al | Al | Al |
| Half-decay exposure ($E_{50}$) lux.sec. | 1120 | 1900* | 970 | 1200 | 975 |
| Evlution of the print images | Excellent | Good | Excellent | Excellent | Excellent |

*Bis-(4-dimethylaminophenyl)methane was used as a chemical sensitizer.

COMPARATIVE EXAMPLE 3

Example 22 was repeated using a mere mixture of dibenzyl aniline of the formula

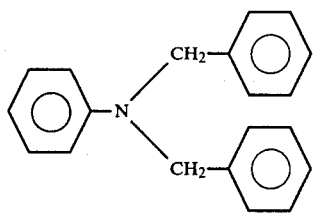

and the highly condensed xylene/formaldehyde resin which had the same nitrogen content instead of the tertiary amino-containing resin used in Example 22. The photosensitive characteristics of the resulting coated layer were measured, but it did not show any sensitivity. When a tungsten-filament lamp having an illumination intensity five times as great as that used above was employed, the layer did not show any sensitivity, either.

EXAMPLE 31

500 mg of the tertiary amino-containing resin formed between the xylene/formaldehyde resin and diphenylamine shown in Example 21 and 500 mg of the tertiary amino-containing resin formed between the xylene/formaldehyde resin and N,N'-diphenyl-p-phenylenediamine shown in Example 27 were each dissolved in 6 ml. of methylethyl ketone containing 100 mg of trinitrofluorenone. Each of the resulting solutions was coated on the aluminum plate using a Wheeler coater, and dried. The half-decay exposure measured was 350 lux.-sec and 600 lux.sec, respectively. The print images were excellent in both cases.

EXAMPLES 32 TO 37

These Examples use various cocondensation components.

The xylene/formaldehyde resin, aromatic amino compound, concondensation component and catalyst (m-xylenesulfonic acid) were reacted in the proportions shown in Table 4 at the temperature and for the time shown in Table 4. The yield, melting point, inherent viscosity and nitrogen content of the resulting tertiary amino-containing resins were measured, and the results are shown in Table 4.

Using each of the resins obtained, electrophotographic sensitive layers were prepared in the same manner as in Example 1 (non-sensitized), and the half-decay exposure and the quality of print images were determined.

On the other hand, using each of the resins obtained, electrophotographic sensitive layers were prepared in accordance with the recipe of Example 19 (in the case of Examples 32 to 35) and the recipe of Example 10 (in the case of Examples 36 and 37), and the half-decay exposure and the quality of print images were determined.

The results are both shown in Table 4.

Table 4

| Example | | 32 | 33 | 34 | 35 | 36 | 37 |
|---|---|---|---|---|---|---|---|
| Xylene/formaldehyde resin (g) | | 400 | 20 | 40 | 20 | 10 | 10 |
| Aromatic amine (g) | | Carbazole (200) | Carbazole (20) | Carbazole (20) | Carbazole (20) | Benzyl aniline (8.8) | Methyl aniline (10.2) |
| Cocondensation component (g) | | Anthracene (200) | Tetrachloroxylene (1) | Anthracene (10) t-Butyl phenol (10) | t-Butyl phenol (5) | p-Chlorophenol (7.5) | p-Chlorophenol (6.8) |
| m-Xylenesulfonic acid (g) | | 4 | 0.2 | 0.4 | 0.2 | 0.1 | 0.1 |
| Reaction temperature (°C.) | | 200 | 200 | 200 | 170 | 200 | 200 |
| Reaction time (hours) | | 2 | 4 | 4 | 4 | 2 | 2 |
| Yield (g) | | 644 | 29.2 | 62 | 22.9 | 16.3 | 144 |
| Melting point (°C.) | | 129–133 | 151 | 130 | 154 | 46 | 52–53 |
| Inherent viscosity | | 0.12 | 0.08 | 0.07 | 0.07 | 0.08 | 0.07 |
| Nitrogen content (%) | | 2.27 | 4.14 | 1.90 | 3.68 | 4.98 | 5.79 |
| Half-decay exposure (lux.sec) | Non-sensitized | $1.4 \times 10^4$ | 9000 | $1.6 \times 10^4$ | $1.4 \times 10^4$ | $1.8 \times 10^4$ | $1.7 \times 10^4$ |
| | sensitized | 200 | 120 | 150 | 210 | 780 | 488 |

EXAMPLES 38 TO 55

The tertiary amino-containing resin obtained in Example 32 (a concondensate of the xylene/formaldehyde resin, carbazole and anthracene) was mixed with each of the binders, chemical sensitizers and optical sensitizers shown in Table 5 in the proportions indicated in Table 5.

The resulting mixture was coated on each of the supports shown in Table 5, and dried. The photosensitive characteristics of the resulting photosensitive layers were measured, and the results are shown in Table 5.

Table 5

| Example | 38 | 39 | 40 | 41 | 42 |
|---|---|---|---|---|---|
| Tertiary amino-containing resin (mg) | 600 | 600 | 600 | 600 | 600 |
| Solvent (ml) | Methylethyl ketone (3) | Methylethyl ketone (3) | Methylethyl ketone (3) | Chlorobenzene (3) | Chlorobenzene (3) |
| Binder (mg) | Ester resin (400) | Ester resin (200) | Ester resin (200) | Ester resin (200) | Polystyrene (100) |
| Solvent (ml) | Methylethyl ketone (2.0) | Methylethyl ketone (1.0) | Methylethyl ketone (1.0) | Methylethyl ketone (1.0) | Chlorobenzene (0.5) |

Table 5-continued

| Chemical sensitizer (mg) | 2,4,7-Trinitro-fluorenone (400) | Trimellitic anhydride (100) | 4-Chloro-3-nitrobenzoic acid (100) | p-Bromophenol (100) | Bis-(4-dimethyl-aminophenyl)methane (100) |
|---|---|---|---|---|---|
| Solvent (ml) | Methylethyl ketone (2.0) | Methylethyl ketone (0.50) | Methylethyl ketone (0.50) | Methylethyl ketone (0.50) | Methylethyl ketone (1.0) |
| Optical sensitizer (mg) | Crystal Violet (0.5) | Crystal Violet (0.5) | Crystal Violet (0.5) | Crystal Violet (0.5) | Crystal Violet (0.5) |
| Support | Al | Al | Al | Al | Al |
| Half-decay exposure (lux.sec) | 130 | 90 | 90 | 120 | 104 |
| Evaluation of the print images | Excellent | Excellent | Excellent | Excellent | Excellent |

| Example | 43 | 44 | 45 | 46 | 47 |
|---|---|---|---|---|---|
| Tertiary amino-containing resin (mg) | 600 | 600 | 600 | 600 | 600 |
| Solvent (ml) | Methylene chloride (3.0) | Methylethyl ketone (3.0) | Methylethyl ketone (3.0) | Methylethyl ketone (3.0) | Methylethyl ketone(3.0) |
| Binder (mg) | Polycarbonate (100) | Alkyd resin (100) | Polyvinyl acetate (100) | Acrylic resin (200) | Ester resin (100) |
| Solvent (ml) | Methylene chloride (1.0) | Methylethyl ketone (0.50) | Methylethyl ketone (0.50) | Methylethyl ketone (1.0) | Methylethyl ketone (0.5) |
| Chemical sensitizer (mg) | Bis-(4-dimethylamino-phenyl)methane (200) | Bis-84-dimethylamino-phenyl)methane (200) | 4-Chloro-3-nitrobenzoic acid (50) | Trimellitic anhydride (100) | — |
| Solvent (ml) | Methylethyl ketone (1.0) | Methylethyl ketone (1.0) | Methylethyl ketone (0.25) | Methylethyl ketone (1.0) | — |
| Optical sensitizer (mg) | Crystal Violet (0.5) | Crystal Violet (0.5) | Crystal Violet (0.5) | Crystal Violet (0.5) | Kayaset Blue BOH (0.5) |
| Support | Al | Al | PET-film | T-paper | Al |
| Half-decay exposure (lux.sec) | 169 | 176 | 390 | 165 | 860 |
| Evaluation of the print images | Excellent | Excellent | Excellent | Excellent | Excellent |

| Example | 48 | 49 | 50 | 51 | 52 |
|---|---|---|---|---|---|
| Tertiary amino-containing resin (mg) | 600 | 600 | 600 | 600 | 600 |
| Solvent (ml) | Methylethyl ketone (3.0) | Methylethyl ketone (3.0) | Methylethyl ketone (3.0) | Methylethyl ketone (5.0) | Methylethyl ketone (3.0) |
| Binder (mg) | Ester resin (100) | Ester resin (100) | Ester resin (100) | — | Ester resin (400) |
| Solvent (ml) | Methylethyl ketone (0.5) | Methylethyl ketone (0.5) | Methylethyl ketone (0.5) | — | Methylethyl ketone (2.0) |
| Chemical sensitizer (mg) | — | — | — | 2,4,7-Trinitro-fluorenone | 4-chloro-3-nitrobenzoic acid (100) Trimellitic anhydride (100) |
| Solvent (ml) | — | — | — | Methylethyl ketone (2.0) | Methylethyl ketone (1.0) |
| Optical sensitizer (mg) | Victoria Pure Blue BOH (0.5) | Turquioise Blue 776 (0.5) | Methyl Violet Pure Special (0.5) | — | Crystal Violet (0.5) |
| Support | Al | Al | Al | Al | Al |
| Half-decay exposure (lux.sec) | 800 | 860 | 890 | 200 | 146 |
| Evaluation of the print images | Excellent | Excellent | Excellent | Excellent | Excellent |

| Example | | 53 | 54 | 55 |
|---|---|---|---|---|
| Tertiary amino-containing resin (mg) | | 600 | 600 | 600 |
| Solvent (ml) | | Methylethyl Chlorobenzene ketone (3.0) | Tetrahydrofuran (3.0) | (3.0) |
| Binder (mg) | | Ester resin (400) | Ester resin (400) | Ester resin (400) |
| Solvent (ml) | | Methylethyl ketone (2.0) | Methylethyl ketone (2.0) | Tetrahydrofuran (2.0) |
| Chemical sensitizer (mg) | | m-Nitrobenzoic acid (200) | Phthalic anhydride (200) | 2,4,6-Trichloro-phenol (200) |
| Solvent (ml) | | Methylethyl ketone (1.0) | Methylethyl ketone (1.0) | Methylethyl ketone (1.0) |
| Optical sensitizer (mg) | | Crystal Violet | Crystal Violet | Crystal Violet |

Table 5-continued

| | (0.5) | (0.5) | (1.0) |
|---|---|---|---|
| Support | Al | Al | al |
| Half-decay exposure (lux.sec) | 260 | 195 | 180 |
| Evaluation of the print images | Excellent | Excellent | Excellent |

EXAMPLE 56

500 mg of the tertiary amino-containing resin used in Example 35 (the cocondensate prepared from the xylene/formaldehyde resin, carbazole, anthracene and t-butylphenol), and 100 mg of 2,4,7-trinitrofluorenone were dissolved in 6 ml of methyl ethyl ketone. The resulting solution was coated on the aluminum plate using a rotary coater, and dried. The half-decay exposure amount of the resulting photosensitive layer was 95 lux.sec. The print image was of excellent quality.

EXAMPLES 57 AND 58

10 g of the same tertiary amino-containing resin obtained in Example 1, (1) was dissolved in 50 ml. of chloroform, and the solution was contacted with a solution of 80 ml of chloroform in 8 g of bromine to brominate the resin. Thus, 8.6 g of a modified tertiary amino-containing resin having the following characteristics was obtained.

Melting point: 175°–178° C.
Inherent viscosity: 0.09
Bromine content: 28.84% by weight
Nitrogen content: 2.89% by weight
Proportion of aromatic amino groups per benzene nucleus: 0.78

The resulting tertiary amino-containing resin was mixed with the binder resin, chemical sensitizer and optical sensitizer shown in Table 6 to form a coating solution. The coating solution was coated on the aluminum plate, and dried. The half-decay exposure of the resulting photosensitive layers and the quality of the print images were determined, and the results are shown in Table 6.

Table 6

| Example | 58 | 59 |
|---|---|---|
| Tertiary amino-containing resin (mg) | 600 | 600 |
| Solvent (ml) | Methylethyl ketone (3.0) | Chlorobenzene (3.0) |
| Binder (mg) | Ester resin (100) | Ester resin (100) |
| Solvent (ml) | Methylethyl ketone (0.5) | Chlorobenzene (0.5) |
| Chemical sensitizer (mg) | bis-(4-dimethylaminophenyl)methane (200) | 4-chloro-3-nitrobenzoic acid (200) |
| Solvent (ml) | Methylethyl ketone (1.0) | Chlorobenzene (1.0) |
| Optical sensitizer (mg) | Crystal Violet (0.5) | Crystal Violet (0.5) |
| Half-decay exposure (lux.sec) | 98 | 410 |
| Evaluaton of the print images | Excellent | Excellent |

EXAMPLE 59

500 mg of the brominated tertiary amino-containing resin used in Example 58, 300 mg of 2,4,7-trinitrofluorenone, and 50 mg of Crystal Violet were dissolved in 10 ml. of methyl ethyl ketone. The resulting solution was coated on the aluminum plate using a Wheeler coater, and dried. The half-decay exposure of the resulting photosensitive layer was 14 lux.sec which means very high sensitivity. The quality of the resulting print image was excellent.

EXAMPLE 60

A 100 ml three-necked flask was charged with 23.5 g (non-volatile content 52%) of the resol resin, 16.7 g of carbazole and 0.2 g of m-xylenesulfonic acid, and they were stirred at 80° C. for 1 hour in an atmosphere of nitrogen to distill off the volatile component contained in the resol resin. The reaction was continued for an additional 2 hours at 230° C. to afford 22 g of a black brown tertiary amino-containing resin. Measurement of the NMR spectrum of the product showed no peak (12.3 ppm) ascribable to >N$\underline{H}$ of the carbazole. It was thus confirmed that all the starting carbazole reacted with the resol resin.

The tertiary amino-containing resin obtained had the following characteristics.

Melting point: above 300° C.
Inherent viscosity: 0.274
Nitrogen content: 5.79% by weight
Aromatic amino content per benzene nucleus: 1.41

The resulting product was dissolved in N-methylpyrrolidone to form a 10% solution. The solution was coated on the aluminum plate by a Wheeler coater, and dried by a vacuum dryer (1 mmHg abs.) at 70° C. for 12 hours. The half-decay exposure amount of the resulting photosensitive layer, measured using a 100-W tungsten-filament lamp of 300 lux, was 7500 lux.sec.

COMPARATIVE EXAMPLE 4

10.7 g (0.10 mole) of N-monomethyl aniline, 7.5 g (0.10 mole) of 37% formaldehyde (formalin) and 12 ml of conc. hydrochloric acid were placed in a 100 ml. three-necked flask, and reacted at 100° C. for 8 hours. The reaction product was neutralized to a pH of 7 using a sodium carbonate solution. The solid was filtered, washed with water, and dried at 50° C. and 1 mmHg for 12 hours to afford 10.8 g (m.p. 85°–86° C.) of a black solid. From the fact that the nitrogen content of the product determined by elemental analysis was 11.63% by weight, it was presumed to be a 1:1 (mole) condensate between N-monomethyl aniline and formalin.

Coating was attempted in the same way as in Example 20 using the resulting condensation product. But it had poor solubility in common solvents, and a uniform coating could not be obtained.

What we claim is:

1. An electrophotographic sensitive layer which comprises:
    (1) at least one solvent-soluble aromatic amino-containing photoconductive resin as a photoconductive base;
    (2) at least one sensitizer selected from the group consisting of optical sensitizers and chemical sensitizers; and
    (3) at least one solvent-soluble binder polymer having compatibility with said solvent-soluble aromatic amino-containing photoconductive resin (1);

said solvent-soluble aromatic amino-containing photoconductive resin (1) being a reaction product of (i) a soluble low-molecular-weight polycondensate comprising a xylene/formaldehyde resin or a resol-type phenolic resin with (ii) an aromatic amino compound, said polycondensate having a molecular weight of 200 to 3,000 and having dimethylol ether groups, methylol groups and/or functional groups thereof, the content of said groups being one per 0.1 to 3 benzene rings of said polycondensate, said reaction product containing, bonded to the benzene ring, as pendant groups, at least one N-methylene aromatic amino group at a rate of at least one per 0.5 to 7 benzene rings, said N-methylene aromatic amino group being selected from the following group:

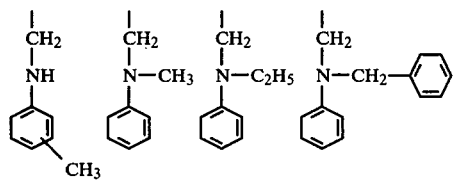

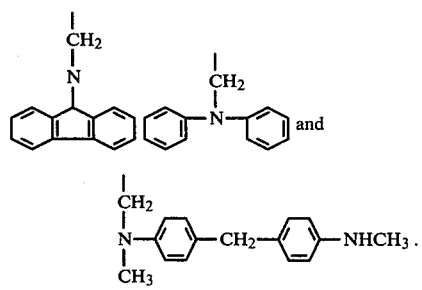

2. The electrophotographic sensitive layer of claim 11 wherein said soluble aromatic amino-containing resin has an inherent viscosity, determined at 30° C. for a solution of this resin dissolved in N-methyl-pyrrolidone in a concentration of 0.5 gram/100 ml., of 0.03 to 0.8.

3. The electrophotographic sensitive layer of claim 1 wherein said aromatic amine compound is selected from the group consisting of aniline, toluidine, N-methylaniline, N-ethylaniline, N-benzylaniline, carbazole, and diphenylamine.

4. The electrophotographic sensitive layer of claim 1 wherein said soluble aromatic amino-containing resin is one in which (1) the ring carbon atoms of said polycondensate,
(2) the nitrogen atom forming the amino group of said aromatic amine compound, and
(3) 0.1–3 moles, per mole of the aromatic amine compound, of at least one of the ring carbon atoms of an aromatic compound containing at least 3 aromatic rings, and the ring carbon atoms of a phenolic aromatic compound containing at least one phenolic hydroxyl group as a substituent on the carbon atoms of the aromatic ring, are bonded substantially through a methylene group.

5. The electrophotographic sensitive layer of claim 4 wherein said aromatic compound containing at least 3 aromatic rings is selected from the group consisting of anthracene, perylene and phenanthrene, and said phenolic aromatic compound is selected from the group consisting of phenol, o-cresol, m-cresol, mixed cresol, 3,5-xylenol and t-butylphenol.

6. The electrophotographic sensitive layer of claim 1 which includes at least one optical sensitizer and at least one chemical sensitizer.

7. The electrophotographic sensitive layer of claim 1 wherein said chemical sensitizer has the properties of an electron acceptor, or is a halogen-containing organic compound.

8. The electrophotographic sensitive layer of claim 1 wherein said chemical sensitizer is a halogenated phenol or a derivative thereof.

9. The electrophotographic sensitive layer of claim 1 wherein said optical sensitizer is a triarylmethane dye.

10. The electrophotographic sensitive layer of claim 1 wherein said soluble aromatic tertiary amino-containing resin contains an aromatic tertiary amino group derived from carbazole or its nucleus-substituted derivative, and has blended therewith at least one chemical sensitizer of the following formula

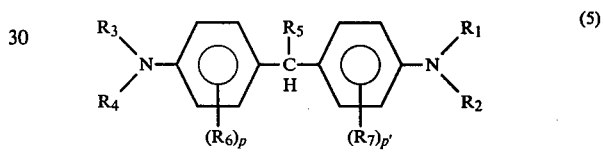 (5)

wherein $R_1$ to $R_4$ are identical or different, and represent an alkyl, alicyclic or aralkyl group containing 1 to 7 carbon atoms, and $R_5$ represents at least one of a hydrogen atom, alkyl, alicyclic, aryl, aralkyl groups containing 1 to 7 carbon atoms, and

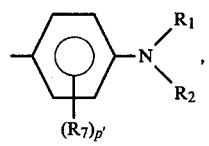

$R_6$ and $R_7$ are identical or different and represent a lower alkyl group containing 1 to 3 carbon atoms or a halogen group, and p and p' represent an integer of 0 to 2.

11. The process for preparing an electrophotographic material comprising a support and the electrophotographic sensitive layer of claim 18 coated thereon, said process comprising coating on said support a solution in an organic solvent of said soluble aromatic amino-containing photoconductive resin and at least one of said sensitizers, and said binder polymer; and drying the coating to at least substantially completely remove the organic solvent.

* * * * *

UNITED STATES PATENT AND TRADEMARK OFFICE
CERTIFICATE OF CORRECTION

PATENT NO. : 4,218,247
DATED : August 19, 1980
INVENTOR(S) : Shigeyoshi Hara; Iwao Omae, both of Japan It is certified that error appears in the above—identified patent and that said Letters Patent is hereby corrected as shown below:

IN THE CLAIMS:

Claim 11, line 3, delete "18", insert --2--.

Signed and Sealed this

Twenty-fifth Day of November 1980

[SEAL]

Attest:

SIDNEY A. DIAMOND

Attesting Officer

Commissioner of Patents and Trademarks